(12) United States Patent
Ripley (10) Patent No.: US 12,527,981 B2
(45) Date of Patent: Jan. 20, 2026

(54) DISTRIBUTED WASTEWATER COLLECTION, TREATMENT AND REUSE SYSTEM WITH INTEGRATED, INTELLIGENT WILDFIRE DEFENSE

(71) Applicant: Dana K. Ripley, Pleasanton, CA (US)

(72) Inventor: Dana K. Ripley, Pleasanton, CA (US)

( * ) Notice: Subject to any disclaimer, the term of this patent is extended or adjusted under 35 U.S.C. 154(b) by 644 days.

(21) Appl. No.: 17/947,081

(22) Filed: Sep. 16, 2022

(65) Prior Publication Data

US 2023/0091027 A1    Mar. 23, 2023

Related U.S. Application Data

(60) Provisional application No. 63/245,618, filed on Sep. 17, 2021.

(51) Int. Cl.
| | | |
|---|---|---|
| *A62C 3/02* | (2006.01) | |
| *C02F 1/00* | (2023.01) | |

(52) U.S. Cl.
CPC ............... *A62C 3/02* (2013.01); *C02F 1/001* (2013.01); *C02F 2209/005* (2013.01)

(58) Field of Classification Search
CPC ....... A62C 3/02; A62C 3/0264; A62C 3/0292; C02F 1/001; C02F 1/008; C02F 1/006;
(Continued)

(56) References Cited

U.S. PATENT DOCUMENTS

2002/0023762 A1 * 2/2002 Kotliar .................. B01D 53/02
                                                      62/640
2006/0175263 A1 * 8/2006 Rice .......................... C02F 9/00
                                                     210/221.2
(Continued)

OTHER PUBLICATIONS

Newsom's $5.1 Billion Plan for Water Infrastructure, Drought Response and Improved Climate Resilience: Drought Budget Fact Sheet. https://web.archive.org/web/20210902020201/https://www.counties.org/sites/main/files/file-attachments/drought_budget_fact_sheet.pdf.

(Continued)

*Primary Examiner* — Arthur O. Hall
*Assistant Examiner* — Juan C Barrera
(74) *Attorney, Agent, or Firm* — Intellent Patents LLC; Ahmed Alhafidh (57) ABSTRACT

An intelligent sewage system designed for use in municipalities around the Wildland Urban Interface incorporates a decentralized network of wastewater treatment units to process wastewater from a plurality of parcels. The decentralized wastewater treatment units spread a Biological Oxygen Demand (BOD) reduction of the wastewater throughout the system and effluent is delivered efficiently through a pressure sewage system. Non-potable and potable water supplies are generated and delivered to individually separable water distribution zones throughout the municipality. The system also provides an auxiliary high-pressure, high-flow non-potable water supply to compensate during depressurization events and bolster the water distribution zones in the event of a wildfire emergency event. The intelligent sewage system also incorporates a comprehensive wildfire defense network and a supervisory control and data acquisition system which work in concert to harden the municipality against wildfire risks and combat active wildfires.

20 Claims, 5 Drawing Sheets

(58) Field of Classification Search
CPC .......... C02F 2209/005; C02F 2209/006; C02F 2209/008; C02F 2209/03; C02F 1/32; C02F 1/444; C02F 3/04; C02F 3/1257; C02F 3/1268; C02F 2209/02; C02F 2209/42; C02F 2305/04; C02F 3/006; C02F 2209/40
USPC .......................................................... 169/54
See application file for complete search history.

(56) References Cited

U.S. PATENT DOCUMENTS

| | | | | |
|---|---|---|---|---|
| 2009/0188567 | A1* | 7/2009 | McHugh | A62C 37/50 137/15.05 |
| 2018/0155903 | A1* | 6/2018 | Völk | E03B 7/078 |
| 2019/0300393 | A1* | 10/2019 | Fleckner | B06B 1/04 |
| 2021/0276908 | A1 | 9/2021 | Ripley | |

OTHER PUBLICATIONS

Bennet Engineering Services, Town of Paradise Sewer Project: Alternatives Analysis and Feasibility Report: Determining a Preferred Option for Implementation. Jun. 21, 2017. https://web.archive.org/web/20210509015148/https://paradisesewer.com/wp-content/uploads/2016/05/Paradise-Sewer-Project-Report-Staff-Report-dated-062117.pdf.

California Fire Safe Council. Recommendations for Hardening your Home to Better Survive Wildfire. FireSafeCouncil.org.

California Legislature. Assembly Bill No. 36. Dec. 7, 2020. https://web.archive.org/web/20220306011338/http://www.leginfo.ca.gov/pub/15-16/bill/asm/ab_0001-0050/ab_36_bill_20150427_amended_asm_v98.pdf.

California Regional Water Quality Control Board. Resolution No. R5-2009-0028. In Support of Regionalization, Reclamation, Recycling, and Conservation for Wastewater Treatment Plants. Apr. 2009. https://web.archive.org/web/20220121031542/https://www.waterboards.ca.gov/centralvalley/board_decisions/adopted_orders/resolutions/r5-2009-0028.pdf.

Conservation Biology Institute, Paradise Nature-Based Fire Resilience Project: Final Report. Jun. 2020. https://www.paradiseprpd.com/files/fcda41b0a/1.Paradise.Final.Report.2020.0715.pdf.

Governor's Office of Planning and Research. Final Report of the Commission on Catastrophic Wildfire Cost and Recovery. Jun. 17, 2019. https://web.archive.org/web/20220901012808/https://opr.ca.gov/docs/20190618-Commission_on_Catastrophic_Wildfire_Report_FINAL_for_transmittal.pdf.

Hannah Northey. "Torched towns beset by poisoned water". E&E News. Sep. 23, 2020. https://web.archive.org/web/20220712042122/https://www.eenews.net/articles/torched-towns-beset-by-poisoned-water/.

Lisa Stiffler. "New interactive tool using satellites and AI creates more precise wildfire maps for public, firefighters". Jul. 22, 2021. https://web.archive.org/web/20210722162900/https://www.geekwire.com/2021/interactive-new-tool-using-satellites-ai-creates-precise-wildfire-maps-public-firefighters/.

Miranda Green. "Should homeowners pay for climate change?". CalMatters. Jun. 30, 2021. https://web.archive.org/web/20220911060320/https://calmatters.org/economy/2021/06/california-wildfire-insurance-climate-change/.

National Foam Inc. A Firefighter's Guide to Foam. https://web.archive.org/web/20220331095349/http://www.foamtechnology.us/Firefighters.pdf.

Nelson Irrigation Corporation. Big Gun sprinkler specification sheet.

Pennsylvania Department of Environmental Protection, Electric Use at Pennsylvania Sewage Treatment Plants, Mar. 2011, Figure 6. https://web.archive.org/web/20191228103418/https://www.dvrpc.org/EnergyClimate/WSTP/Conference/pdf/ElectricUseReport.pdf.

State of California Office of Legislative Counsel. Senate Bill No. 129. Jul. 12, 2021. https://web.archive.org/web/20220420083619if_/https://leginfo.legislature.ca.gov/faces/billNavClient.xhtml?bill_id=202120220SB129.

State of California Office of Legislative Counsel. Senate Bill No. 63. Dec. 7, 2020. https://web.archive.org/web/20210910001913/https://leginfo.legislature.ca.gov/faces/billNavClient.xhtml?bill_id=202120220SB63.

State Water Resources Control Board. Water Quality Control Policy for Recycled Water. Dec. 11, 2018. https://web.archive.org/web/20220826110111/https://www.waterboards.ca.gov/board_decisions/adopted_orders/resolutions/2018/121118_7_final_amendment_oal.pdf.

Steve Van Dyke. San Francisco Fire Department Water Supply System. Bureau of Engineering and Water Supply SFFD. Nov. 2017.

Town of Paradise, Phase 1 Executive Summary: Paradise Sewer Project, Dec. 21, 2020. https://web.archive.org/web/20220320074418/http://paradisesewer.com/wp-content/uploads/2021/02/6c-Attachment-1-HDR-Engineering-Phase-1-Executive-Summary.pdf.

Town of Paradise, Technical Memorandum #3: Evaluation of Collection System, Paradise Sewer Project, Nov. 11, 2020. https://web.archive.org/web/20210509003214/https://paradisesewer.com/wp-content/uploads/2021/04/2020-HDR-Technical-Memo-3-Collection-System.pdf.

Town of Paradise, Town of Paradise Launches Environmental Review for Paradise Sewer Project, May 3, 2021, https://web.archive.org/web/20210509005806/https://paradisesewer.com/wp-content/uploads/2021/04/Paradise-NOP-News-Release.pdf.

Urban Design Associates. Community Recovery Plan—Make it Paradise. Apr. 18, 2019. https://web.archive.org/web/20220224232836/https://issuu.com/makeitparadise/docs/2350rptbook_final190624.

US Bureau of Reclamation. WaterSMART: Environmental Water Resources Projects, Drought Resiliency Projects, and Water and Energy Efficiency Grants Draft Eligibility and Evaluation Criteria for Review and Comment. May 2021. https://web.archive.org/web/20220706111414/https://www.usbr.gov/watersmart/docs/2021/Draft-Eligibility-and-Evaluation-Criteria-for-Review-and-Comment.pdf.

US Government Publishing Office. House Resolution 1352. Feb. 25, 2021. https://web.archive.org/web/20220126191949/https://www.congress.gov/bill/117th-congress/house-bill/1352/text.

Will Denner. "In response to blazes, PG&E plans to bury 10K miles of power lines". Chico Enterprise-Record. Jul. 22, 2021.

Will Denner. "Local representatives criticize state's management of wildfires, water" Aug. 4, 2021. Chico Enterprise-Record. https://web.archive.org/web/20210804120505/https://www.chicoer.com/2021/08/04/lamalfa-gallagher-nielsen-criticize-state-leaderships-management-of-wildfires-water-and-other-resources/.

* cited by examiner

DISTRIBUTED WASTEWATER COLLECTION, TREATMENT AND REUSE SYSTEM WITH INTEGRATED, INTELLIGENT WILDFIRE DEFENSE

CLAIM OF PRIORITY

The present application claims benefit of U.S. Provisional Patent Application Ser. No. 63/245,618, titled DISTRIBUTED WASTEWATER COLLECTION, TREATMENT AND REUSE SYSTEM WITH INTEGRATED, INTELLIGENT WILDFIRE DEFENSE, filed Sep. 17, 2021, the entire disclosure of which is hereby expressly incorporated by reference herein.

FIELD OF TECHNOLOGY

This disclosure relates generally to wastewater reuse and distribution systems, and, more particularly, to a system for managing a municipal water supply that decentralizes biological oxygen demand (BOD) reduction, recharges water table resources, mitigates the risk of wildfire spread, and provides numerous wildfire defense and prevention strategies.

BACKGROUND

Changes in climate are creating greater wildfire risk and particularly in drought-prone regions such as California. Preventing and fighting wildfires places an overwhelming burden on a community's water supply. Without advance preparation or sufficient water supply and water distribution tools, a community's firefighting effort would be powerless to stop a rapidly spreading wildfire. A recent example is the Camp Fire of November 2018, which destroyed most of the town of Paradise in Butte County, California. During the devastation, Paradise's water supply experienced significant abrupt depressurization and volatile organic compounds (VOCs) were introduced as smoke, debris, and other contaminants were drawn into damaged or exposed pipeline service connections and structures.

Communities like Paradise consist of parcels in the Wildland Urban Interface (WUI) which are vulnerable to uncontrolled wildfires. Addressing the wildfire safety of these communities is a growing concern as drought conditions worsen, especially in communities where water infrastructure is limited. Parcels in a rural WUI typically rely on a septic tank system and effluent reclamation, treatment, and reuse is not available locally.

Wildfire-stricken communities experience numerous compounding issues after experiencing significant wildfire destruction and damage to water supply infrastructure: the population rapidly declines, the city and county at large are forced to rely more on neighboring cities and counties for wastewater treatment and groundwater supply, insurance underwriting becomes prohibitively expensive or entirely unavailable, and local groundwater resources dwindle. These and other factors create significant multi-dimensional challenges for recovery efforts.

One way that cities deal with wastewater is to export it to a neighboring city to be further treated or simply dumped into a nearby river or outlet to the ocean. For example, the City of Chico discharges secondary effluent into the Sacramento River and does not apply any tertiary treatment to its wastewater. See California Water Service, 2020 Urban Water Management Plan. Although these immediate solutions seem easy, they chiefly ignore the need to make water a renewable resource. As a result, engineering costs are sunk into piping water out of the city instead of reclamation and reuse facilities. As surface and groundwater resources dwindle in persistent droughts, a community's ability to prevent and fight wildfire is significantly diminished at the parcel level and across the community as a whole.

Thus, there exists a need for an intelligent water supply system for WUI municipalities that conserves water resources and distributes locally reclaimed and treated wastewater according to a predictive wildfire response system, allowing a community to harden itself against potential and imminent wildfire emergencies without preventing surface and groundwater resources from diminishing.

SUMMARY

Discussed herein is an intelligent sewage system comprising a wastewater reclamation and reuse subsystem and a wildfire monitoring and defense subsystem. The wastewater reclamation and reuse subsystem comprises a plurality of septage interceptor tanks receiving raw sewage from one or more parcels in a wildland urban interface and producing a primary effluent; one or more secondary treatment facilities receiving the primary effluent from the septage interceptor tanks and producing a secondary effluent; one or more tertiary treatment facilities receiving a portion of the secondary effluent from the secondary treatment facilities and producing a tertiary effluent; one or more non-potable water reservoirs, including one or more seasonal water storage and one or more seasonal aquifer recharge dispersal sites; a pressure sewage system configured to deliver the primary effluent, the secondary effluent, and the tertiary effluent, wherein at least a portion of the secondary effluent and the tertiary effluent is stored in the one or more non-potable water reservoirs and at least a portion of the tertiary effluent is stored in one or more operational storage sites.

The wildfire monitoring and defense subsystem receives a potable water supply and a non-potable water supply from the wastewater reclamation and reuse subsystem. The wildfire monitoring and defense subsystem comprises a plurality of water distribution zones which are individually separable to prevent a rapid propagation of depressurization events across one or more water distribution zones and contaminant backflow therebetween. The water distribution zones comprise a service connection at each of the one or more parcels and in between one or more water distribution zones in proximity thereto. The wildfire monitoring and defense subsystem additionally comprises; an auxiliary high-pressure non-potable water supply providing a high-pressure, high-flow rate non-potable water supply; a buffer zone irrigation network distributed around the one or more parcels; and a wildfire defense network.

The intelligent sewage system also comprises a plurality of data processing devices communicatively coupled through a network, each of the data processing devices being configured to generate device data and environmental data associated with one or more of: the one or more parcels; the decentralized treatment units; the water distribution zones and the service connections thereof, the auxiliary high-pressure, non-potable water supply; the buffer zone irrigation network; the wildfire defense network; and the one or more non-potable water reservoirs. the data processing devices each comprise one or more processors, a network adapter, and at least one memory which stores instructions executable by the one or more processors, the instructions comprising: receiving device data and environmental data from the data processing devices; receiving third party data;

detecting, based on the device data, the environmental data, and the third-party data, one or more precursors to a wildfire emergency in and/or around the one or more parcels; manipulating water supply access to the water distribution zones and the buffer zone irrigation network to provide a proportionate response in advance of the wildfire emergency; and manipulating water supply access to the wildfire defense network associated with the wildfire emergency to provide a proportionate response in real-time to the wildfire emergency.

Also discussed herein is an intelligent sewage system comprising a plurality of decentralized wastewater treatment units servicing a plurality of parcels within a municipality located in a wildland urban interface. The decentralized wastewater treatment units are configured geographically and hierarchically with respect to the parcels based on water supply requirements thereof and to spread a biological oxygen demand reduction requirement of a raw sewage generated by the parcels across the decentralized wastewater treatment units.

The decentralized wastewater treatment units comprise: a plurality of septage interceptor tanks receiving the raw sewage from their corresponding parcels and generating a primary effluent; one or more secondary treatment facilities receiving the primary effluent from the septage interceptor tanks and generating a secondary effluent; one or more tertiary treatment facilities receiving the secondary effluent and generating a tertiary effluent.

The intelligent sewage system also comprises one or more non-potable water reservoirs, including one or more seasonal water storage and one or more seasonal aquifer recharge dispersal sites. In addition, the intelligent sewage system comprises an effluent-only pressure sewage system configured to deliver the primary effluent, the secondary effluent, and the tertiary effluent. At least a portion of the secondary effluent and the tertiary effluent is stored in the one or more non-potable water reservoirs and at least a portion of the tertiary effluent is stored in one or more operational storage sites.

The intelligent sewage system also comprises a plurality of individually separable water distribution zones each comprising a service connection at each of the one or more parcels and in between one or more water distribution zones in proximity thereto.

The intelligent sewage system also comprises an auxiliary high-pressure non-potable water supply providing a high-pressure, high-flow rate water supply.

The intelligent sewage system also comprises a buffer zone irrigation network distributed around the one or more parcels.

The intelligent sewage system also comprises a wildfire defense network.

The intelligent sewage system also comprises a plurality of data processing devices communicatively coupled through a network, each of the data processing devices being configured to generate device data and environmental data associated with one or more of: the parcels; the decentralized treatment units; the water distribution zones and the service connections thereof, the auxiliary high-pressure, non-potable water supply; the buffer zone irrigation network; the wildfire defense network; and the one or more non-potable water reservoirs. the data processing devices each comprise one or more processors, a network adapter, and at least one memory which stores instructions executable by the one or more processors, the instructions comprising: receiving device data and environmental data from the data processing devices; receiving third party data; detecting, based on the device data, the environmental data, and the third-party data, one or more precursors to a wildfire emergency in and/or around the one or more parcels; manipulating water supply access to the water distribution zones and the buffer zone irrigation network to provide a proportionate response in advance of the wildfire emergency; and manipulating water supply access to the wildfire defense network associated with the wildfire emergency to provide a proportionate response in real-time to the wildfire emergency.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

The following describes a comprehensive system for wastewater reuse, water supply management, and wildfire defense usable by municipalities in Wildland Urban Interfaces (WUIs). In these communities, wastewater treatment is usually performed at on-site septic tanks which are serviced on a regular basis.

The system incorporates a decentralized approach to wastewater treatment, opting to maintain the use of on-site septage tanks in order to aid in biological oxygen demand (BOD) reduction ahead of effluent reclamation at nearby facilities. A pressure sewer system collects effluent from septage tanks and routes it to a local water recycling facility which produces secondary effluent. A portion of the secondary effluent undergoes further tertiary treatment. The effluent is used to recharge groundwater resources and is distributed to numerous non-potable endpoints, including a multi-zone distribution system, an auxiliary high-pressure water supply system, one or more seasonal aquifer recharge dispersal sites, a buffer zone irrigation network, and a wildfire prevention and defense network. Additionally, separate distribution zones do not share pressure and/or utilize pressure switches to insulate zones from each other in the event of a depressurization event.

The system also incorporates a comprehensive wildfire response system which effectively manages a community water supply system ahead of and during a wildfire emergency. The wildfire response system factors in environmental data and device data to detect conditions that suggest an imminent wildfire event and actuates control measures across the water supply system to distribute resources effectively before, during, and after the wildfire event. Environmental data includes, but is not limited to, past/current weather, weather forecast data, wind direction/speed, humidity levels, current groundwater stores, satellite imagery, and any other relevant environmental data that may be aggregated by system sensors or third party public and private real time software platforms. Device data includes, but is not limited to, temperatures, water supply pressure data across the distribution zones, operational water storage levels, pump station flow rate(s), soil moisture sensor data, and other data aggregated by third party public and private real time software platforms.

Figure 1:
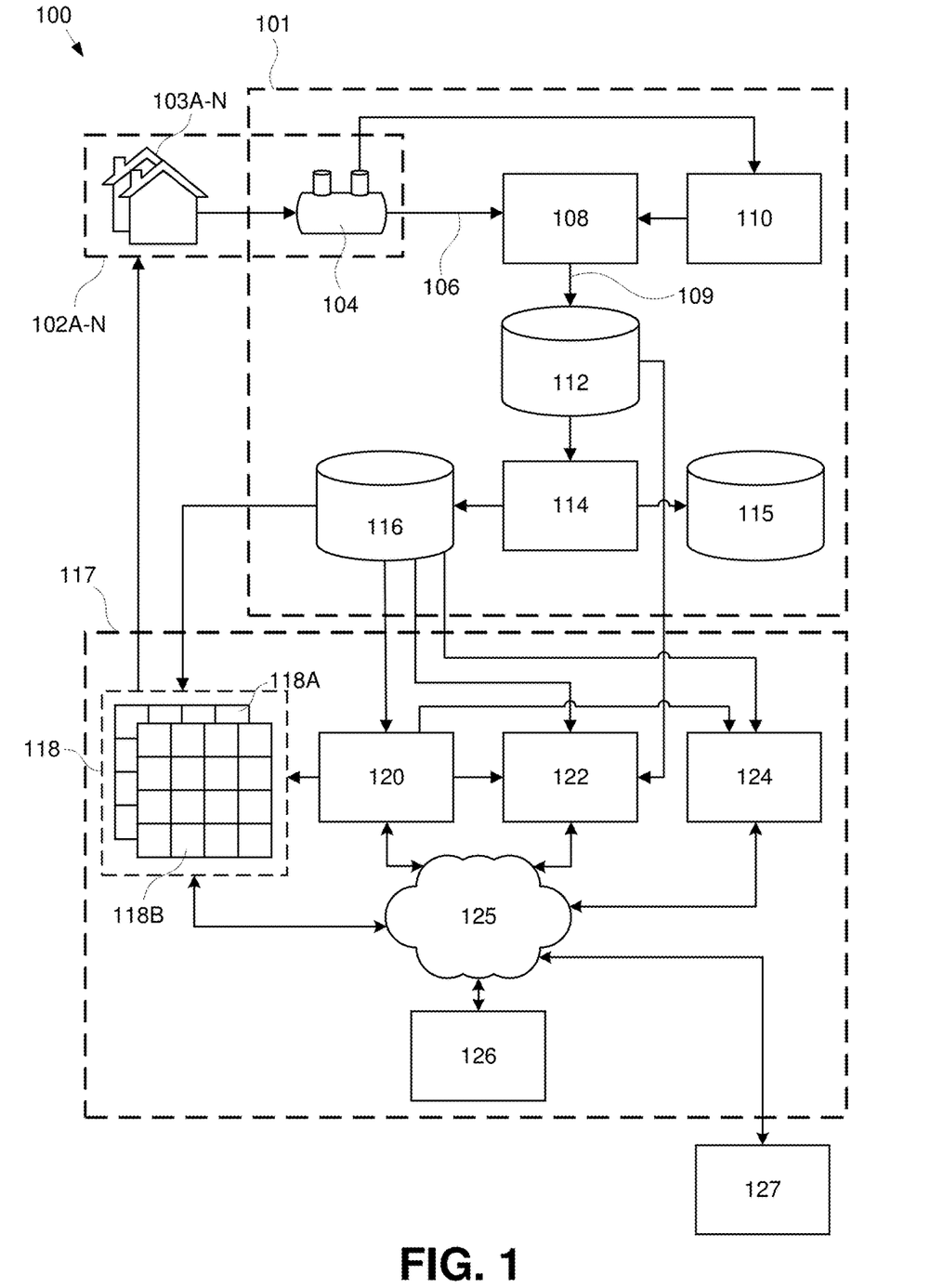
FIG. 1 is a block diagram of an exemplary intelligent sewage system, according to one or more embodiments.

Referring to FIG. 1, a block diagram of an exemplary intelligent sewage system 100 is shown. In one or more embodiments, a wastewater reclamation and reuse subsystem 101 of the intelligent sewage system 100 comprises on-site septic storage 104 servicing one or more sewage generators 103A-N associated with one or more parcels 102A-N, an effluent-only pressure sewer collection means 106, a secondary treatment facility 108 generating a secondary effluent 109, a septage receiving facility 110, a seasonal water storage 112, a tertiary treatment facility 114, one or more seasonal aquifer recharge dispersal sites 115, and an operational water storage 116. The operational water storage 116 may be configured to provide water access to a number of operational endpoints within a water supply distribution and wildfire defense subsystem 117 which comprises at least one or more water distribution networks 118 (including separate potable distribution networks 118A and non-potable distribution networks 118B) comprising a plurality of pressure zones, an auxiliary high-pressure water supply system 120, a buffer zone irrigation network 122, and a wildfire prevention and defense network 124. The water supply distribution and wildfire defense subsystem 117 also comprises a supervisory control and data acquisition (SCADA) 126 system.

Although a typical gravity sewer can be incorporated to divert sewage to a primary processing facility instead of a septic tank network, the system as described herein is geared toward low and medium density communities especially in rural WUIs, where septic tanks and related services are more prevalent. Installing a gravity sewer in such communities may also be impractical from an engineering standpoint; high costs can be incurred from deep excavation or having to deal with difficult terrain. See Evaluation of Collection System, Technical Memorandum #3 and page 17 and 58 of Feasability Report, Bennett 2017. Rather, the system benefits by allowing primary sewage treatment to occur during the residence time in the network of septic tanks 104; in fact, at least 80% of BOD and suspended solids (SS) reduction occurs during a 6-day residence time in a 1500-gallon septic tank (assuming typical house sewage generation of around 200 gallons per day (gpd))(Tchobanoglous, Water Reuse). This reduction prevents having to expend as much energy during later treatment. Furthermore, decentralized storage of sewage prior to secondary treatment prevents secondary facilities from being overwhelmed by surges in flow, or secondary facilities may be temporarily unavailable due to planned or unplanned power outages.

Effluent collected by the on-site septic storage 104 is transported to the secondary treatment facility 108 via the effluent-only pressure sewer collection means 106. The effluent-only pressure sewer collection means 106 is a low-cost, low-impact alternative to a gravity sewer and is optimized for decentralized effluent collection from the totality of on-site septic storage 104. Installation of the pressure sewer collection means 106 commonly involves horizontal directional drilling (HDD) construction and is a preferred alternative to opening deep trenches (usually around 20 feet deep) for bulky gravity sewage pipes. HDD construction is commonly used for other underground utilities such as potable and recycled water distribution, underground electrical power distribution, cable television, and fiber optic cable.

The secondary treatment facility 108 incorporates an energy-efficient wastewater treatment process involving multiple stages of aerobic bioreactors and one or more trickling filter towers. An exemplary trickling filter implementation is described in Pub No. 2021/0276908, which is incorporated by reference herein. Other secondary treatment alternatives may be used instead, such as extended aeration, membrane bioreactors, sequential batch reactors, or an oxidation ditch. However, trickling filter treatment is known to consume the least kilowatt-hour per pound of BOD reduction (i.e., less than 0.4 kWh/lb BOD). See Tchobanoglous Table 17-3, Water Research Foundation, and Pennsylvania Department of Environmental Protection. The secondary treatment facility 108 may be a decentralized network of localized wastewater treatment facilities and may comprise units spread throughout the community to be able to manage local wastewater treatment demand and improve distribution of non-potable wastewater. The septage receiving facility 110 may be co-located with the secondary treatment facility 108 and may receive biosolids and SS accumulated from the distributed septic tanks 104. Received biosolids and SS may be broken down and the effluent therefrom may be routed back to the secondary treatment facility 108.

The secondary effluent 109 from the secondary facility 108 may be drained into one or more seasonal water storage sites 112, capable of storing up to approximately 120 days of water retained during winter months for use during the irrigation season. The operational storage 116 on the other hand, contains around 1-2 days-worth of water to buffer hourly imbalances and preserve a baseline storage for fire suppression. The secondary effluent 109 may undergo tertiary treatment at an adjoining tertiary treatment facility 114, which may involve sand or microfiltration and/or ultraviolet (UV) disinfection. A portion of the effluent from the tertiary treatment facility 114 may be apportioned to one or more seasonal aquifer recharge dispersal sites 115 including recycled individual residential leachfields surrounding or within parcels 102A-N. The system may seasonally discharge tertiary effluent in these dispersal sites 115 to account for seasonal changes in local irrigation demand and provide more renewable access to reusable water for the community during fire emergencies. Especially during the months of October through March, excess recycled water is produced than required for irrigation. Strategically depositing tertiary effluent in residential leachfields during these months helps harden parcels from the risk of wildfire spread. See El Dorado Irrigation District, page 5.

The remaining portion of the tertiary effluent from the tertiary treatment facility 114 is routed to an operational water storage 116, which may comprise a centrally located water storage tank or a distributed network of water reservoirs supplying multiple pressure zones. The operational water storage 116 is chiefly responsible for feeding water to the separate pressure zones of the distribution networks 118, a high-pressure auxiliary non-potable water supply system 120, a buffer zone irrigation network 122, and a wildfire prevention and defense network 124.

The community's integrated water supply system 100 may comprise separate potable and non-potable water distribution networks 118A and 118B. The distribution networks 118A-B may include service connections throughout the municipality and at each parcel 102A-N. The service connections include pressure regulating valves, water meters, and may also include backflow prevention devices. Separating the distribution networks 118A-B prevents abrupt increases in non-potable water demand due to firefighting activity from depressurizing the potable water distribution network 118B. Furthermore, backflow of contaminants in the non-potable system due to wildfire damage would not impact the water quality of the potable system. It is also preferable to utilize backflow prevention devices at all service connections, further preventing contaminants from leeching into the distribution networks 118. Despite these decontamination and depressurization measures, the system is able to immediately redistribute resources effectively between zones, in part due to the auxiliary non-potable water supply system (AWSS) 120. As such, the intelligent sewage system 100 serves to preserve and facilitate access to water volume and water pressure, both of which are essential to guaranteeing normal functioning but even moreso when there is significant stress on the water supply, such as during a wildfire emergency.

The AWSS 120 can provide a high volume of water at sufficient highly pressure from designated service connections throughout the system 100. The AWSS 120 may be similar in design and purpose to the San Francisco AWSS; see San Francisco Fire Department Water Supply System. The AWSS 120 can provide a reliable water supply for firefighting without assistance from a fire engine. Additionally, the AWSS 120 can be utilized to bolster the water distribution networks 118 in preparation for an imminent wildfire emergency. Keeping the AWSS 120 separable from the water distribution networks 118 further prevents depressurization events from propagating across the network and preserves the AWSS 120 as a backup for individual zones of the water distribution networks 118 that have been separated from other zones (e.g., during a depressurization event, for fighting wildfire).

The buffer zone irrigation network 122 is a water supply network that delivers non-potable water to designated buffer zones situated in and around WUI parcels. Reducing the flammability of these buffer zones directly reduces the risk of ignition in nearby urban areas. See Paradise Nature-Based Fire Resilience Project, Final Report. Irrigation techniques used may involve ground level sprinklers, drip lines and leach fields. The wildfire prevention and defense network 124 may comprise rooftop sprinklers, strategically placed fixed water/snow cannons and other firefighting systems. The wildfire defense system may also strategically inject biodegradable foam surfactants specifically formulated to suppress fire and reduce water requirements in fire emergencies.

Sensory data processing units may be integrated into the operational endpoints 118-124 in the form of flow rate monitors, thermistors, barometers, tank capacity monitors, weather stations, smoke sensors, and other sensory data processing units that may be used to detect the preconditions of an imminent wildfire emergency event. These sensory data processing units may be communicatively coupled to the SCADA system 126 through a network 125, such as a local area network or a wide area network. Each of the operational endpoints 118-124 may also comprise a plurality of actuatable devices (see FIG. 3B) that may control their function which may be accessible to the SCADA system 126 through the network 125. A network protocol may be utilized to communicate specific signals to the operational endpoints 118-124 and manipulate the operation thereof.

The SCADA system 126 may also be communicatively coupled to one or more third-party systems 127 and may receive additional data therefrom which may be used in a determination of an imminent or current wildfire emergency event. Third-party systems 127 may include government weather services (e.g., the National Weather Service), weather forecast servers and one or more local agency data centers. One example is RADRFIRE (fire.radr.pnnl.gov), a tool developed by the Pacific Northwest National Laboratory which uses infrared satellite imagery and artificial intelligence to create detailed wildfire maps to track and forecast fires. Another example is InciWeb, an Incident Information System. Additionally, the local firefighting department may provide up-to-date information about wildfire activity that is served directly from an associated data center.

Figure 2:
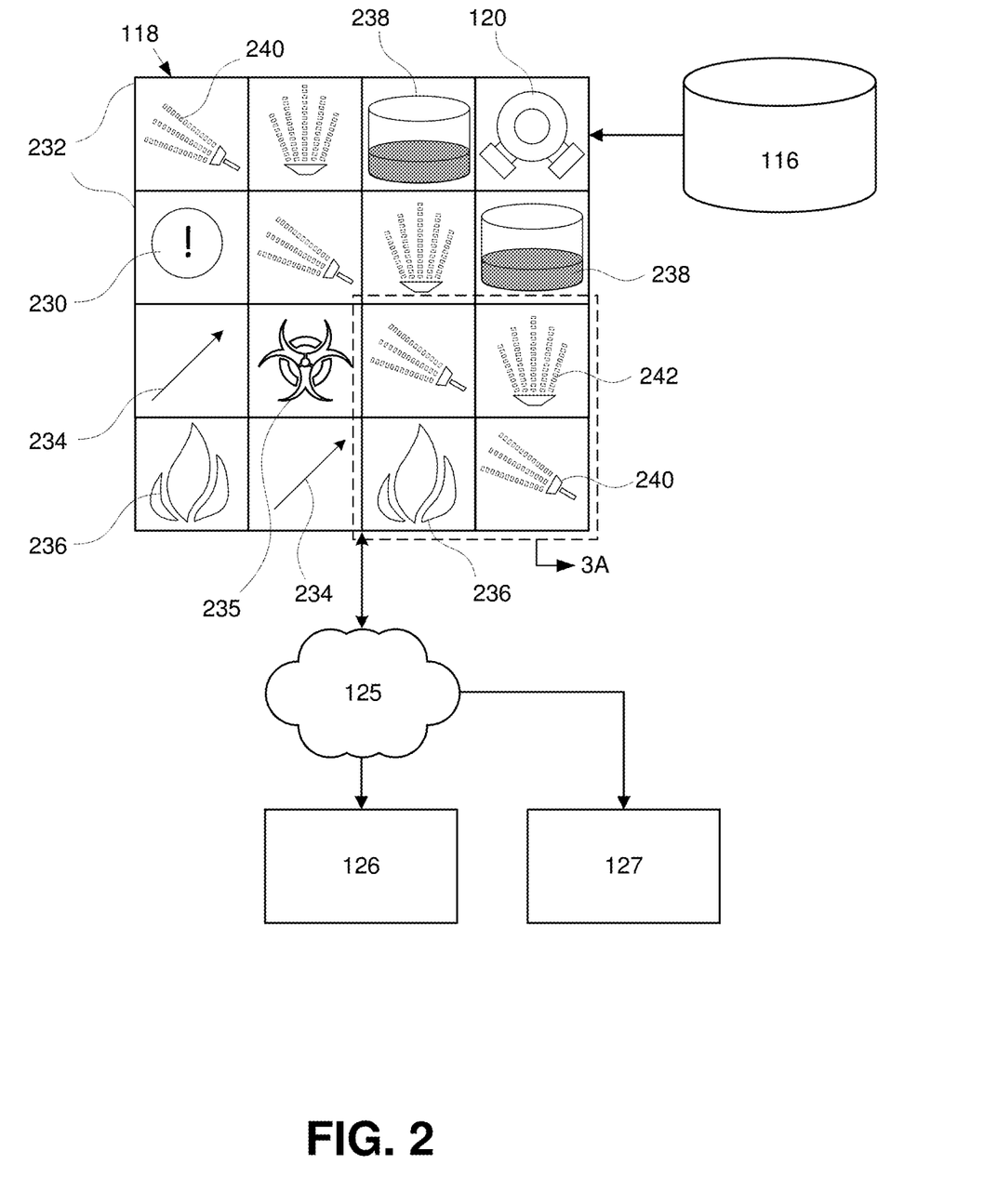
FIG. 2 is a SCADA system view showing water distribution zones, according to one or more embodiments.

Referring to FIG. 2, an exemplary SCADA system view of water distribution zones is shown. In one embodiment, the SCADA system 126 may incorporate a control system which enables fine-tuned manipulation of the operational endpoints 118-124 and a water supply access thereof based on receiving notification of a wildfire emergency event (i.e. through the one or more third-party systems 127) or detecting one or more predetermined factors associated with a wildfire emergency event.

For example, a red flag warning is issued by the National Weather Service when relative humidity (RH) is 15% or less combined with sustained surface winds, or frequent gusts, of 25 mph or greater. Both conditions must occur simultaneously for at least 3 hours in a 12 hour period. Contributing red flag factors include any combination of weather and fuel conditions that would create a critical fire control situation or extensive wildfire outbreak, including: long term drought, much higher than normal temperatures coupled with very low humidity, low fuel moisture, poor nighttime RH recovery, high Energy Release Component (ERC) or Burning Index (BI), and a Haines index of 5 or 6.

Within a water distribution network 118, one or more predetermined factors may include any one or a combination of: a depressurization hazard 230 in one or more pressure zones 232 of the distribution network 118, high prevailing winds and direction 234 thereof, a decontamination event 235 signifying potential contaminant spread, presence of wildfire activity 236 nearby, low water supply levels 238 in nearby pressure zones 232, and low operating pressure data across pressure zones 232. Based on detecting one or more predetermined factors, the SCADA system 126 may automatically adjust water supply access to effectively respond to the wildfire emergency event. The SCADA system 126 may also control strategic injection of biodegradable foam surfactants specifically formulated to suppress fire and reduce water requirements. See A Firefighter's Guide to Foam.

In the example shown in FIG. 2, the combination of the nearby wildfire activity 236 and the prevailing winds and direction 234 thereof may prompt the SCADA system 126 to, for example, activate one or more water cannons 240 (e.g., Nelson BIG GUN®) to actively soak the interface between the wildfire activity 236 and parcels in the immediate pressure zones 232 around the wildfire activity 236. In addition, the SCADA system 126 may activate one or more rooftop sprinklers 242 further downwind of the wildfire activity 236 to prevent the wildfire from spreading due to ember cast. Further yet, the SCADA system 126 may bolster local water supply levels 238 upon detecting nearby wildfire activity 236 by regulating a flow of water from an AWSS 120 service connection, the operational storage 116, or the seasonal water storage 112.

Alternately, the SCADA system 126 may open a bypass system between the seasonal water storage 112 and the local water supply to allow emergency access to one or more of the plurality of local tertiary treatment facilities 114 and subsequently to the operational water storage 116 which feeds the distribution networks 118A-B. Other precursor conditions which may effect SCADA system 126 responses include, but are not limited to precipitation history, groundwater levels, planned/emergency power outages, water supply depressurization events, and high contrasting temperatures between nearby zones.

With two to four days of advance notice of red flag fire warnings coupled with projected wind speed and direction, the SCADA system 126 can proactively increase water content of soils, native vegetation, landscape vegetation, buildings, and hardscapes in the direction of the anticipated risk. Given the high volumes of water required to increase moisture content of large areas of the community, the AWSS 120 can be supplemented, on an emergency basis, with untreated surface water and local wells tapping shallow groundwater recharged by the distributed leachfields. In this way, the shallow groundwater acts as supplemental reserve emergency storage even if that shallow groundwater does not meet potable water drinking standards. Wells that have previously been abandoned due to water quality non-compliance, can be reactivated for routine and/or emergency AWSS supply.

Figure 3A:
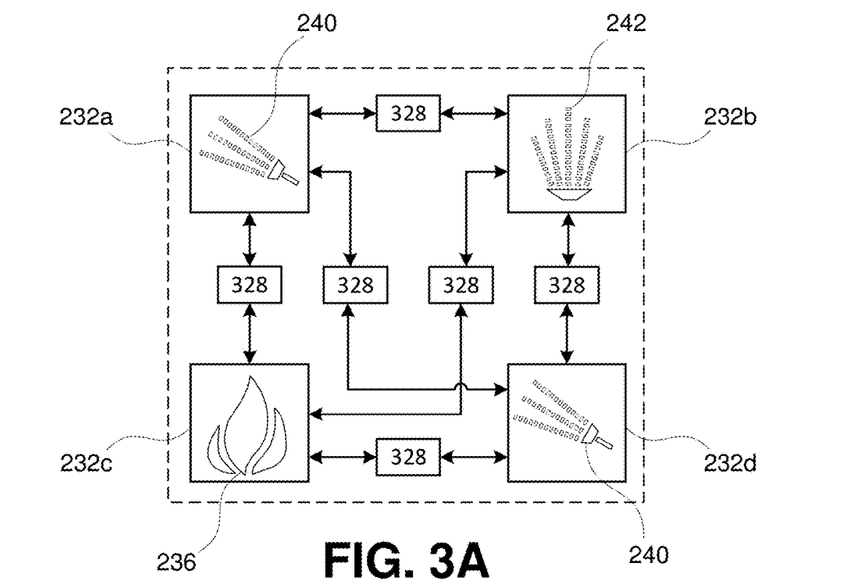
FIG. 3A is a block diagram showing exemplary inter-zone service connections within the water distribution network of FIG. 2
Figure 3B:
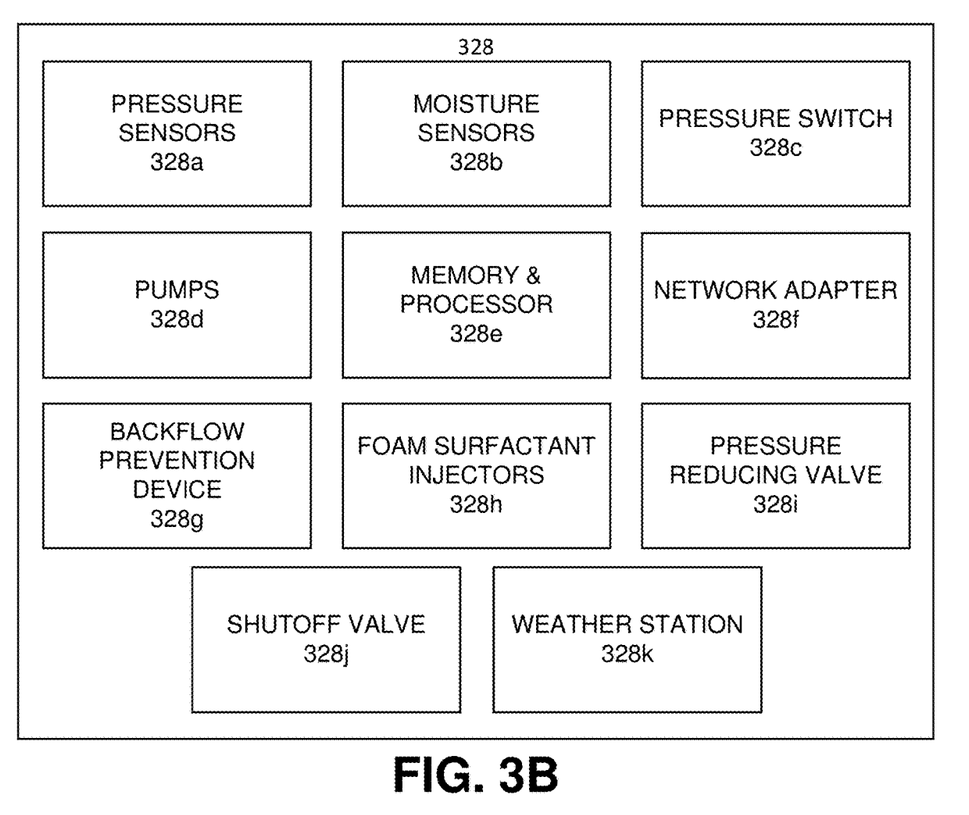
FIG. 3B is a block diagram showing an exemplary data processing device located at service connections throughout the intelligent sewage system of FIG. 1.

FIG. 3A is a block diagram showing exemplary inter-zone service connections between separable water distribution pressure zones 232a-d of the water distribution network 118 of FIG. 2. Any combination of the pressure zones 232a-d may be directly interconnected based on the operational endpoints 118-124 present within the individual pressure zone 232, environmental constraints and/or resource management requirements. Interconnections between individual pressure zones 232a-d may comprise a control unit 328 which, as shown in FIG. 3B, may comprise: pressure sensors 328a configured to monitor the water pressure of pressure zones 232 in either direction, moisture sensors 328b configured to monitor moisture content of the pressure zones 232a-d associated with the control unit 328; a pressure switch 328c sensitive to pressure changes in any direction; one or more pumps 328d configured to pump water between connected pressure zones 232a-d; a memory (volatile and non-volatile) and processor 328e configured to store and execute machine-readable instructions, respectively; a network adapter 328f allowing the control unit 328 to communicate to other data processing devices through a network (such as a Wide Area Network); one or more backflow prevention devices 328g which serve to prevent contaminants from flowing between zones or prevent non-potable water sources from mixing with potable water supply; one or more foam surfactant injectors 328h configured to be used in the event of a wildfire event (e.g. wildfire activity 236); and a pressure reducing valve 328i configured to regulate pressure at related service connections for potable water supply in corresponding pressure zones 232a-d. In all cases, the control unit 328 is an intimate part of the SCADA system 126 throughout the water distribution network 118 and the rest of the operational endpoints 118-124 because it relays vital data to the SCADA system 126, allowing the SCADA system 126 to enact system-wide measures that may serve to harden the community from anticipated wildfire threats or act immediately in the case of a present wildfire threat.

Working in tandem with system-wide SCADA measures, the control unit 328 may be configured with logic that may automatically act upon features detected in related pressure zones 232a-d. For example, the control unit 328 may be the first to detect and respond to a depressurization hazard 230 in a zone by activating a pressure switch sensitive to a threshold drop in pressure; actuation of the pressure switch may cause the control unit 328 to sever water supply service connections to nearby zones, thus preventing the pressure of the water supply in those zones from being compromised or the water supply from being contaminated by backflow. In another example, the control unit 328 may detect a threshold low relative humidity through a humidity sensor of the weather station 328k and detect a low moisture in soil surrounding the control unit through the moisture sensors 328b. The control unit 328 may subsequently direct a water supply to the buffer zone irrigation network 122 corresponding to the control unit 328 and activate one or more rooftop sprinklers of the wildfire defense network 124 atop buildings in the distribution network 118 associated with the control unit 328.

In the event that the wildfire defense network 124 is actively fighting the spread of the wildfire 236 across zones (e.g., using water cannons 240), the control unit 328 may activate foam surfactant injectors 328h, which serves to mitigate the water volume needed to contain the wildfire emergency 236. If a depressurization event occurs and a pressure zone 232 is isolated from nearby pressure zones, the control unit 328 may provide a bypass to the AWSS 120 in order to provide sustained water supply and pressure to wildfire-fighting devices.

Wildfire generally spreads through traveling embers, radiant heat, and direct flame. Embers are small pieces of burning material that can travel more than a mile ahead of a wildfire. Ember storms generated during an intense wildfire will cause spot fires once they land on combustible material. This can be prevented or at least mitigated ahead of time, for example, by raising the ground and air moisture content of pressure zones 232a, 232b, and 232d since they are in proximity and/or downwind of the wildfire 236 emergency in pressure zone 232c. Given the wind speed and distance to the wildfire 236 origin, optimal moisture conditions can be attained and additional water supply flow may be directed to provide ample reserves for the water cannons 240 to be able to fight the wildfire spreading from pressure zone 232c. Additionally, foam surfactant injected into the water cannons 240 may mitigate water use. Pre-emptive measures which serve to manage resources on a more system-wide level may involve the SCADA system 126 increasing ground moisture content through the buffer zone irrigation network 122 and routing water from the operational storage 116 or one or more nearby non-potable water distribution zones 118B to increase local non-potable water reservoirs that may be needed to fight incoming embers cast by wind. The SCADA system 126 may additionally activate roof sprinklers 242 installed on top of buildings to, for example, prevent embers from igniting fuel in gutters.

Figure 4:
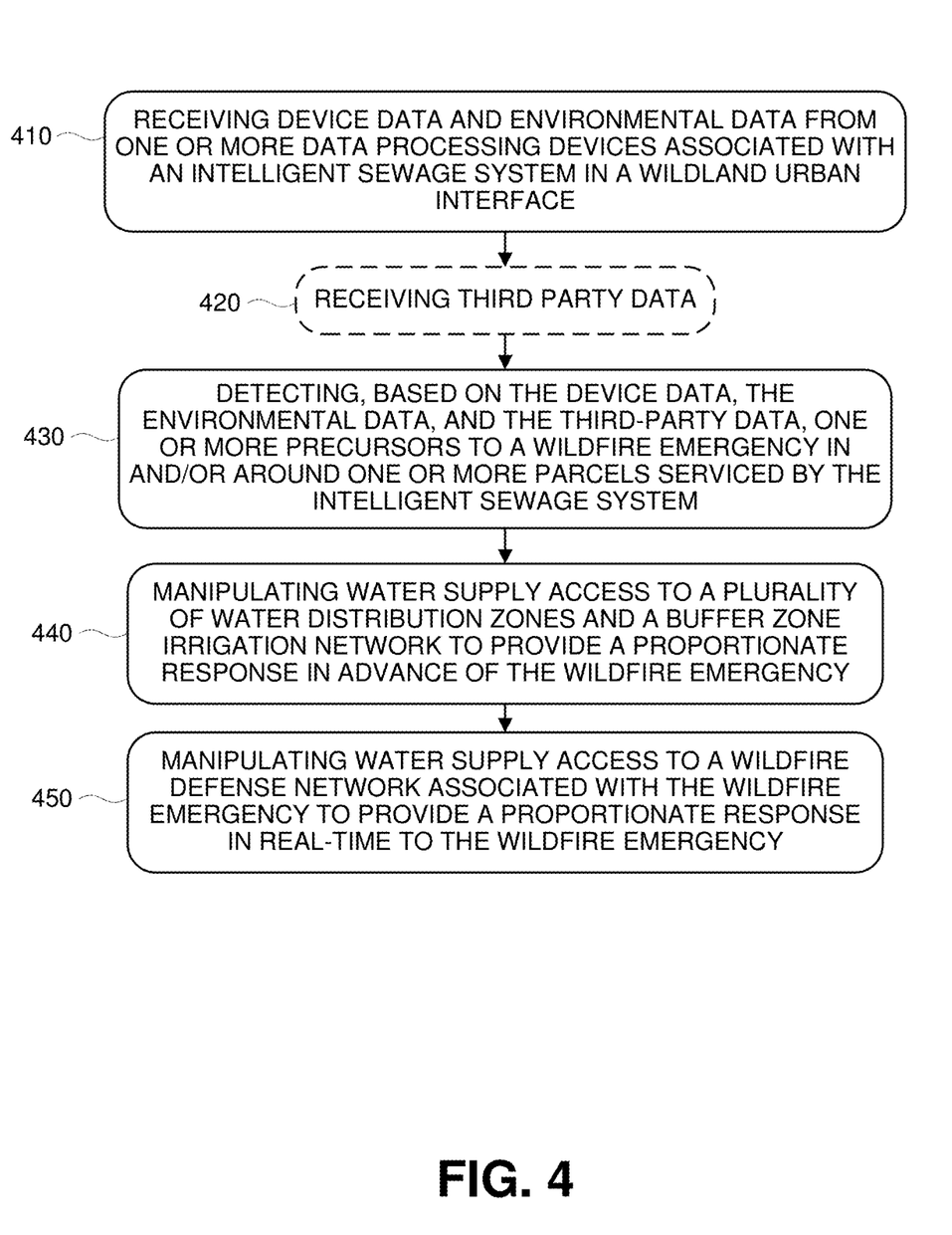
FIG. 4 is a flow chart showing an exemplary SCADA response to a wildfire emergency.
Figure 5:
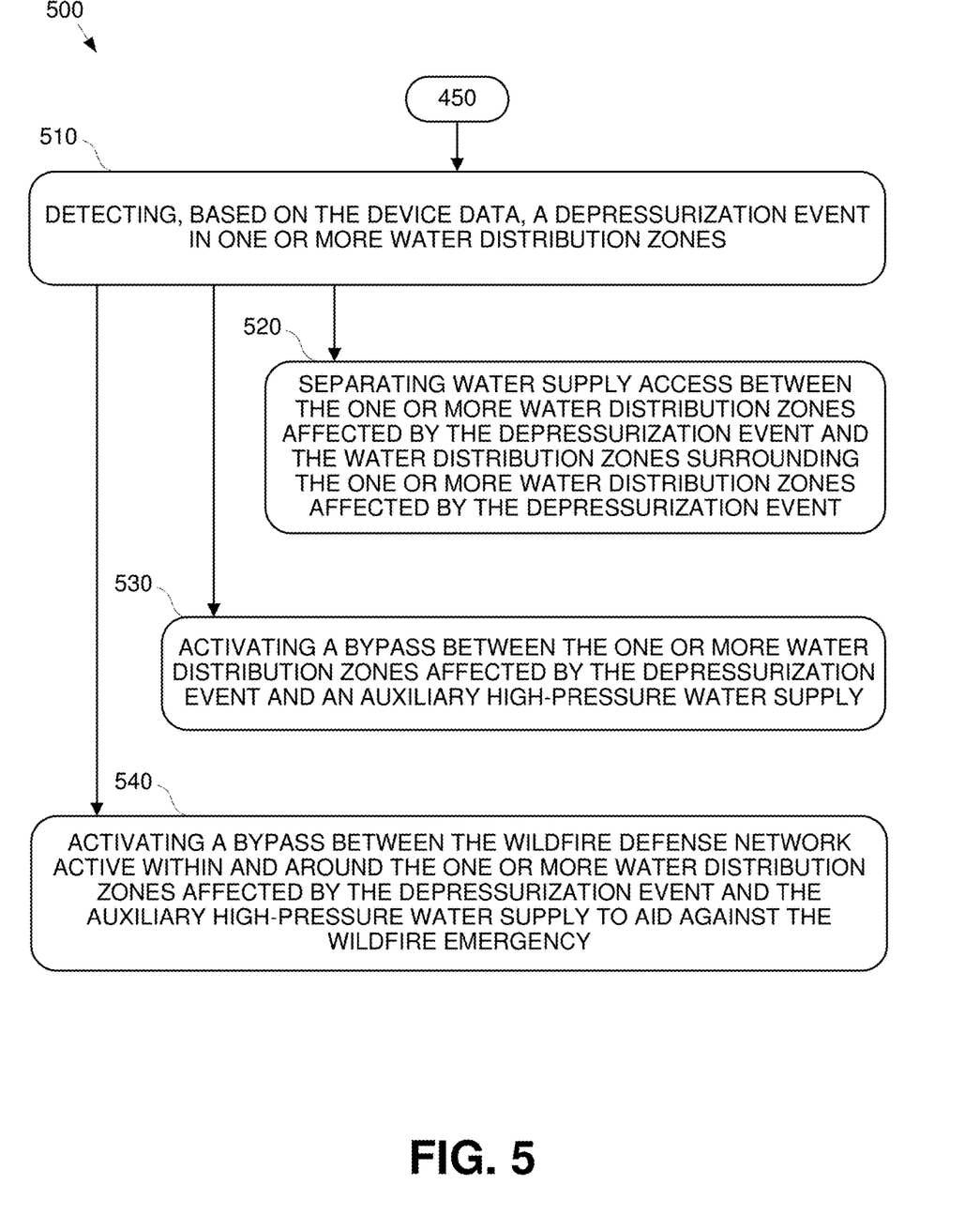
FIG. 5 is a flow chart showing an exemplary SCADA response to a depressurization event.

FIG. 4 shows a flow chart showing an exemplary SCADA response 400 to a wildfire emergency. Step 410 involves receiving device data and environmental data from one or more data processing devices associated with an intelligent sewage system in a wildland urban interface. Step 420 involves optionally receiving third party data. Step 430 involves detecting, based on the device data, the environmental data, and the third-party data, one or more precursors to a wildfire emergency in and/or around one or more parcels serviced by the intelligent sewage system. Step 430 involves manipulating water supply access to a plurality of water distribution zones and a buffer zone irrigation network to provide a proportionate response in advance of the wildfire emergency. Step 440 involves manipulating water supply access to a wildfire defense network associated with the wildfire emergency to provide a proportionate response in real-time to the wildfire emergency. FIG. 5 shows a flow chart showing an exemplary SCADA response 500 to a depressurization event. Following Step 440 above, step 510 involves detecting, based on the device data, a depressurization event in one or more water distribution zones. The response 500 can proceed with any one or combination of any of steps 520, 530, and 540. Step 520 involves separating water supply access between the one or more water distribution zones affected by the depressurization event and the water distribution zones surrounding the one or more water distribution zones affected by the depressurization event. Step 530 involves activating a bypass between the one or more water distribution zones affected by the depressurization event and an auxiliary high-pressure water supply. Step 540 involves activating a bypass between the wildfire defense network active within and around the one or more water distribution zones affected by the depressurization event and the auxiliary high-pressure water supply to aid against the wildfire emergency.

The invention claimed is:

1. A sewage system configured for wildfire emergency response, comprising:
    a wastewater reclamation and reuse subsystem comprising:
        a plurality of septage interceptor tanks receiving raw sewage from one or more parcels in a wildland urban interface and producing a primary effluent;
        one or more secondary treatment facilities receiving the primary effluent from the septage interceptor tanks and producing a secondary effluent;
        one or more tertiary treatment facilities receiving a portion of the secondary effluent from the secondary treatment facilities and producing a tertiary effluent;
        one or more non-potable water reservoirs, including one or more seasonal water storage and one or more seasonal aquifer recharge dispersal sites;
        a pressure sewage system configured to deliver the primary effluent, the secondary effluent, and the tertiary effluent, wherein at least a portion of the secondary effluent and the tertiary effluent is stored in the one or more non-potable water reservoirs and at least a portion of the tertiary effluent is stored in one or more operational storage sites;
    a water supply distribution and wildfire defense subsystem receiving a potable water supply and a non-potable water supply from the wastewater reclamation and reuse subsystem, the water supply distribution and wildfire defense subsystem comprising:
        a plurality of individually separable water distribution zones,
            wherein the water distribution zones comprise a service connection at each of the one or more parcels and in between adjacent water distribution zones in proximity thereto,
        an auxiliary high-pressure non-potable water supply;
        a buffer zone irrigation network distributed around the one or more parcels;
        a wildfire defense network;
        a plurality of data processing devices communicatively coupled through a network, each of the data processing devices comprising one or more processors, a network adapter, and a memory storing instructions executable by the one or more processors to:
            receive device data and environmental data from the data processing devices and receive third party data;
            detect, based on the device data, the environmental data, and the third-party data, one or more precursors to a wildfire emergency in and/or around the one or more parcels;
            issue control signals which positively control and operate both the wastewater reclamation and reuse subsystem and the water supply distribution and wildfire defense subsystem by actuating one or more: zone isolation valves to direct or block flow between water distribution zones; pressure-reducing valves at service connections to regulate pressure; pumps to deliver non-potable water from the non-potable water reservoirs to the buffer zone irrigation network and/or the wildfire defense network; and foam surfactant injection systems of the wildfire defense network,
            wherein the control signals are selected according to a ruleset that maps the detected one or more precursors to at least one of the foregoing actuations to provide a proportionate response in advance of, and in real time during, the wildfire emergency.

2. The system of claim 1 wherein the plurality of water distribution zones comprises a separate plurality of potable water distribution zones and a plurality of non-potable water distribution zones.

3. The system of claim 2, wherein providing the real-time proportionate response involves opening a bypass valve to couple the auxiliary high-pressure non-potable water supply and the wildfire defense network active within and around one or more affected water distribution zones.

4. The system of claim 1, wherein the instructions further comprise:
    detecting, based on the device data, a depressurization event in one or more water distribution zones, and in response the control signals cause one or more of:
        separating water supply access between the one or more water distribution zones affected by the depressurization event and surrounding water distribution zones;
        opening a bypass valve between the one or more water distribution zones affected by the depressurization event and the auxiliary high-pressure non-potable water supply; and
        opening a bypass valve between the wildfire defense network active within and around the one or more water distribution zones affected by the depressurization event and the auxiliary high-pressure non-potable water supply to aid against the wildfire emergency.

5. The system of claim 1, wherein providing a proportionate response in advance of the wildfire emergency involves operating pumps and valves to deliver non-potable water from the non-potable water reservoirs to the buffer zone irrigation network.

6. The system of claim 1, wherein the device data comprise temperature data, water supply pressure data, operational water storage levels, pump station flow rates, and soil moisture sensor data.

7. The system of claim 1, wherein the environmental data comprises one or more of the group consisting of: forecast data, wind direction, wind speed, humidity levels, and groundwater storage levels.

8. The system of claim 1, wherein the third-party data comprises one or more of the group consisting of: wildfire emergency notifications, planned public safety power shut-off periods, and satellite imagery.

9. The system of claim 1, wherein the service connection comprises a data processing device of the plurality of data processing devices, one or more moisture sensors, one or more pressure sensors, a pressure switch, one or more pumps, a backflow prevention device, a foam surfactant injector, and a pressure reducing valve.

10. The system of claim 1, wherein the wildfire defense network involves one or more firefighting devices configured to respond to the wildfire emergency, including rooftop sprinklers, water cannons, snow cannons, and foam surfactant injection systems.

11. An intelligent sewage system, comprising:
a plurality of decentralized wastewater treatment units servicing a plurality of parcels within a municipality located in a wildland urban interface, the decentralized wastewater treatment units being geographically and hierarchically configured with respect to the parcels based on water supply requirements thereof and to spread a biological oxygen demand reduction requirement of a raw sewage generated by the parcels, the decentralized wastewater treatment units comprising:
a plurality of septage interceptor tanks receiving the raw sewage from their corresponding parcels and generating a primary effluent;
one or more secondary treatment facilities receiving the primary effluent from the septage interceptor tanks and generating a secondary effluent;
one or more tertiary treatment facilities receiving the secondary effluent and generating a tertiary effluent;
one or more non-potable water reservoirs, including one or more seasonal water storage and one or more seasonal aquifer recharge dispersal sites;
an effluent-only pressure sewage system configured to deliver the primary effluent, the secondary effluent, and the tertiary effluent;
wherein at least a portion of the secondary effluent and the tertiary effluent is stored in the one or more non-potable water reservoirs and at least a portion of the tertiary effluent is stored in one or more operational storage sites;
a water distribution and wildfire defense infrastructure that receives a potable water supply and a non-potable water supply from the decentralized wastewater treatment units, the water distribution and wildfire defense infrastructure comprising:
a plurality of individually separable water distribution zones, each zone comprising a service connection at the one or more parcels and in between one or more water distribution zones in proximity thereto,
an auxiliary high-pressure non-potable water supply providing a high-pressure, high-flow rate water supply;
a buffer zone irrigation network distributed around the one or more parcels;
a wildfire defense network;
a plurality of data processing devices communicatively coupled through a network, each of the data processing devices comprising one or more processors, a network adapter, and at least one memory storing instructions that, when executed by the one or more processors, cause the data processing devices to:
receive device data and environmental data from the data processing devices and receive third party data;
detect, based on the device data, the environmental data, and the third-party data, one or more precursors to a wildfire emergency in and/or around the one or more parcels;
issue control signals which positively control and operate both the decentralized wastewater treatment units and the water distribution and wildfire defense infrastructure by actuating one or more of:
zone isolation valves to direct or block flow between selected water distribution zones;
pressure-reducing valves at service connections to maintain target pressure setpoints;
bypass valves to selectively couple the auxiliary high-pressure non-potable water supply to the wildfire defense network and/or to selected water distribution zones;
pumps to deliver non-potable water from the non-potable water reservoirs to the buffer zone irrigation network and/or the wildfire defense network; and
foam surfactant injection systems of the wildfire defense network,
wherein the control signals are selected according to a ruleset that maps the detected one or more precursors including at least wind, humidity, temperature, soil moisture, and zone topology, to at least one of the foregoing actuations to provide a proportionate response in advance of, and in real time during, the wildfire emergency.

12. The system of claim 11 wherein the plurality of water distribution zones comprises a separate plurality of potable water distribution zones and a plurality of non-potable water distribution zones.

13. The system of claim 11, wherein the instructions further cause the data processing devices to:
detect, based on the device data, a depressurization event in one or more water distribution zones,
separating water supply access between the one or more water distribution zones affected by the depressurization event and surrounding water distribution zones;
opening a bypass valve between the one or more water distribution zones affected by the depressurization event and the auxiliary high-pressure non-potable water supply; and
opening a bypass valve between the wildfire defense network active within and around the one or more water distribution zones affected by the depressurization event and the auxiliary high-pressure non-potable water supply to aid against the wildfire emergency.

14. The system of claim 11, wherein providing a proportionate response in advance of the wildfire emergency involves operating pumps and valves to deliver non-potable water from the non-potable water reservoirs to the buffer zone irrigation network.

15. The system of claim 11, wherein providing the real-time proportionate response involves issuing control signals to open a bypass valve that couples the auxiliary high-pressure non-potable water supply and the wildfire defense network active within and around one or more affected water distribution zones.

16. The system of claim 11, wherein the device data comprise temperature data, water supply pressure data, operational water storage levels, pump station flow rates, and soil moisture sensor data.

17. The system of claim 11, wherein the environmental data comprise one or more of the group consisting of: forecast data, wind direction, wind speed, humidity levels, and groundwater storage levels.

18. The system of claim 11, wherein the third-party data comprise one or more of the group consisting of: wildfire emergency notifications, planned public safety power shut-off periods, and satellite imagery.

19. The system of claim 11, wherein the service connection comprises a data processing device of the plurality of data processing devices, one or more moisture sensors, one or more pressure sensors, a pressure switch, one or more pumps, a backflow prevention device, a foam surfactant injector, and a pressure reducing valve.

20. The system of claim 11, wherein the wildfire defense network involves one or more firefighting devices configured to respond to the wildfire emergency, including rooftop sprinklers, water cannons, snow cannons, and foam surfactant injection systems.

* * * * *